United States Patent
Kasei et al.

(10) Patent No.: US 6,509,432 B2
(45) Date of Patent: Jan. 21, 2003

(54) ORDINARY TEMPERATURE CURABLE COATING COMPOSITION

(75) Inventors: Kazuhiko Kasei, Kanagawa (JP);
Toshihiro Hamamura, Kanagawa (JP);
Tadahiro Nakao, Kanagawa (JP);
Chikara Kawamura, Kanagawa (JP)

(73) Assignee: Kansai Paint Co., Ltd., Kanagawa (JP)

( * ) Notice: Subject to any disclaimer, the term of this patent is extended or adjusted under 35 U.S.C. 154(b) by 0 days.

(21) Appl. No.: 09/772,983

(22) Filed: Jan. 31, 2001

(65) Prior Publication Data

US 2002/0010269 A1 Jan. 24, 2002

(30) Foreign Application Priority Data

Mar. 28, 2000 (JP) ........................................ 2000-087857

(51) Int. Cl.[7] ............................................. C08G 65/336
(52) U.S. Cl. ........................... 528/29; 528/25; 525/100; 525/523
(58) Field of Search ................................ 525/100, 101, 525/103, 105, 523, 530; 528/25, 29

(56) References Cited

U.S. PATENT DOCUMENTS

| | | | |
|---|---|---|---|
| 4,614,766 A | * 9/1986 | Schimmel et al. | ......... 525/100 |
| 5,066,698 A | * 11/1991 | Hazan et al. | ............... 524/268 |
| 5,077,354 A | * 12/1991 | Woo et al. | .................. 525/479 |

* cited by examiner

*Primary Examiner*—Robert Dawson
*Assistant Examiner*—Marc S. Zimmer
(74) *Attorney, Agent, or Firm*—Rader, Fishman & Grauer PLLC

(57) ABSTRACT

An ordinary temperature curable coating composition comprises an oxidative curable silicon modified vinyl-based resin (A) which is obtained by combining an epoxy group-containing vinyl copolymer (a) with an unsaturated fatty acid-containing fatty acid component (b) and a silicon resin (c). The vinyl copolymer (a) is a copolymer of an epoxy group-containing polymerizable unsaturated first monomer and a polymerizable unsaturated second monomer copolymerizable with the first monomer. The silicon resin (c) contains a silicon atom and a hydroxyl group and/or an alkoxyl group which is bonded to the silicon atom. The coating composition can form a coating film superior in weathering resistance, coating film gloss, and coating operation properties such as storage property, initial drying property and brush stroke during double coatings with a brush.

9 Claims, No Drawings

ORDINARY TEMPERATURE CURABLE COATING COMPOSITION

FIELD OF THE INVENTION

The present invention relates to an ordinary temperature curable coating composition in which an oxidative curable silicon modified vinyl-based resin is used, and a coating film superior in weathering resistance, initial drying property, and further alkali resistance can be formed.

BACKGROUND OF THE INVENTION

As a conventional coating resin which has ordinary temperature curable property, and is stable in a solution state over a long period, an alkyd resin using an unsaturated fatty acid has been well known, and is generally used in building interior/exterior coatings, but the alkyd resin easily causes weathering deterioration by ultraviolet radiation, and performance is insufficient for use in outdoor purposes. As a technique of solving this weathering resistance problem, for example, an acrylic resin modified by a fatty acid is proposed in British Patent No. 793,776. The fatty acid modified acrylic resin is slightly improved in the weathering resistance. However, since the fatty acid is contained as a low-polarity soft component, coating performances such as weathering resistance, water resistance, acid resistance, and alkali resistance cannot be said to be sufficient.

SUMMARY OF THE INVENTION

The purpose of this invention is to provide an ordinary temperature curable coating composition having excellent properties in weathering resistance, water resistance, acid resistance or alkali resistance. The present invention pertains to an ordinary temperature curable coating composition. In particular, the coating composition comprises, as a resin component, an oxidative curable silicon modified vinyl-based resin (A) which is obtainable by combining an epoxy group-containing vinyl copolymer (a) which is a copolymer of an epoxy group-containing polymerizable unsaturated monomer and another polymerizable unsaturated monomer copolymerizable with the epoxy group-containing polymerizable unsaturated monomer with an unsaturated fatty acid-containing fatty acid component (b) and a silicon resin containing a hydroxyl group and/or an alkoxyl group (c) which is directly bonded to a silicon atom. In the epoxy group-containing vinyl copolymer (a), a copolymerization ratio of the epoxy group-containing polymerizable unsaturated monomer to the other polymerizable unsaturated monomer copolymerizable with the above monomer may be such that the epoxy group-containing polymerizable unsaturated monomer is preferably in a range of 3 to 70 wt % and the other polymerizable unsaturated monomer is preferably in a range of 30 to 97 wt %. The epoxy group-containing vinyl copolymer (a) may be a copolymer whose number-average molecular weight is preferably in a range of 1,000 to 100,000 and whose glass transition temperature is in a range of 0° C. to 100° C. The unsaturated fatty acid-containing fatty acid component (b) may preferably have an iodine number of 50 to 200.

PREFERABLE EMBODIMENTS OF THE INVENTION

In the present invention, an oxidative curable silicon modified vinyl-based resin (A) is a resin which is obtainable by combining an epoxy group-containing vinyl copolymer (a) with an unsaturated fatty acid-containing fatty acid component (b) and a silicon resin (c) containing a hydroxyl group and/or an alkoxyl group which is directly bonded to a silicon atom.

Examples of an epoxy group-containing polymerizable unsaturated monomer which is a copolymerization component of the epoxy group-containing vinyl copolymer (a) include glycidyl (meth)acrylate, β-methylglycidyl (meth)acrylate, 3,4-epoxycyclohexyl methyl (meth)acrylate, 3,4-epoxycyclohexyl propyl (meth)acrylate, and aryl glycidyl ether.

Examples of another polymerizable unsaturated monomers each of which can be copolymerized with the epoxy group-containing polymerizable unsaturated monomer include: alkyl esters, having 1 to 24 carbon atoms, of acrylic acids or methacrylic acids such as methyl (meth)acrylate, ethyl (meth)acrylate, n-butyl (meth)acrylate, isobutyl (meth)acrylate, t-butyl (meth)acrylate, hexyl (meth)acrylate, 2-ethyl hexyl (meth)acrylate, n-octyl (meth)acrylate, decyl (meth)acrylate, lauryl (meth)acrylate, stearyl (meth)acrylate, and cyclohexyl (meth)acrylate; and hydroxyl group-containing monomers such as hydroxyalkyl esters of α,β-ethylenic unsaturated carboxylates which include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate, and α,β-ethylenic unsaturated carboxylate esters having alkylene oxide chains and hydroxyl group which include polyethylene glycol mono (meth)acrylate and polypropylene glycol mono(meth)acrylate. Further, the polymerizable unsaturated monomers that can be copolymerized with the epoxy group-containing polymerizable unsaturated monomer may include isobornyl (meth)acrylate; 1,2,2,6,6,-pentamethyl piperidyl (meth)acrylate; 2,2,6,6-tetramethyl piperidinyl (meth)acrylate; 2-(2'-hydoxy-5'-methacryloxyphenyl)-2H-benzotriazole; styrene; and the like.

In the epoxy group-containing vinyl copolymer (a), a copolymerization ratio of the epoxy group-containing polymerizable unsaturated monomer to the other polymerizable unsaturated monomer is usually such that the epoxy group-containing polymerizable unsaturated monomer is preferably in a range of 3 to 70 wt %, more preferably 5 to 40 wt %, and the other polymerizable unsaturated monomer is preferably in a range of 30 to 97 wt %, more preferably 60 to 95 wt %. This is appropriate with respect to addition reaction property during reaction with the unsaturated fatty acid (b), solubility of the resulting epoxy group-containing vinyl copolymer (a) in a solvent, and the like.

In the epoxy group-containing vinyl copolymer (a), for determination of a usage of a hydroxyl group-containing monomer, the usage should be determined in such a manner that gelation by reaction with a glycidyl group in the vinyl copolymer (a), or gelation during reaction with a silicon resin fails to occur. Usually, it is appropriate and preferable that the usage of the hydroxyl group-containing monomer is 50 parts by weight or less with respect to 100 parts by weight of total monomer components constituting the vinyl copolymer (a).

A copolymerization method for obtaining the epoxy group-containing vinyl copolymer (a) is not particularly limited, but in consideration of ease of reaction with the fatty acid component (b) and a silicon resin (c), a solution polymerization method is preferable which is performed in an organic solvent under existence of a radical polymerization initiator.

Examples of the radical polymerization initiator for use in synthesis by solution polymerization of the epoxy group-containing vinyl copolymer (a) include: azo-based polymerization initiators such as 2,2'-azobisisobutyronitrile and 2,2'-azobis(2,4-dimethylvaleronitrile); and peroxide-based polymerization initiators such as lauryl peroxide, t-butylperoxy-2-ethylhexanoate and benzoyl peroxide. Moreover, examples of the organic solvent for use in synthesis by solution polymerization include: aliphatic hydrocarbon-based solvents such as n-hexane, n-octane, 2,2,2-trimethyl pentane, isooctane, n-nonane, cyclohexane, and methylcyclo hexane; aromatic hydrocarbon-based solvents such as benzene, toluene, xylene and ethyl benzene; petroleum-based solvents such as mineral spirit, "SWASOL 1000" (product of Cosmo Oil Co., Ltd.), petroleum ether, petroleum benzine, and petroleum naphtha; ketone-based solvents such as methyl isobutyl ketone; ester-based solvents such as isobutyl acetate; and alcohol-based solvents such as isopropanol. These solvents can arbitrarily be used alone, or as a mixture of two or more thereof, if necessary.

For the epoxy group-containing vinyl copolymer (a), a number-average molecular weight is preferably in a range of 1,000 to 100,000, more preferably 2,000 to 50,000, and a glass transition temperature (Tg) is preferably in a range of 0° C. to 100° C. This is preferable in view of coating film physical properties and quick-drying properties of a coating film formed using a resulting resin.

The fatty acid component (b) essentially contains an unsaturated fatty acid, and contains a saturated fatty acid if necessary, and an iodine number is preferably in a range of about 50 to 200. If the iodine number is less than 50, curability tends to be deteriorated. On the other hand, an iodine number exceeding about 200 may be undesirable because of a possibility that gelation tends to occur during resin manufacturing.

Typical examples of the unsaturated fatty acid as the essential component of the fatty acid component (b) include fish oil fatty acid, dehydrated castor oil fatty acid, safflower oil fatty acid, linseed oil fatty acid, soybean oil fatty acid, sesame oil fatty acid, poppy seed oil fatty acid, perilla oil fatty acid, hempseed oil fatty acid, grape kernel oil fatty acid, corn oil fatty acid, tall oil fatty acid, sunflower oil fatty acid, cotton seed oil fatty acid, walnut oil fatty acid, and rubber seed oil fatty acid. The unsaturated fatty acid is a fatty acid having a oxidative curable polymerizable unsaturated group, and imparts oxidative curable characteristics to the silicon modified vinyl resin (A).

In addition to the unsaturated fatty acids, the fatty acid component (b) can contain a saturated fatty acid if necessary, and examples of the saturated fatty acid include: nondrying oil fatty acids such as coconut oil fatty acid, hydrofined coconut oil fatty acid, and palm oil fatty acid; caproic acid; capric acid; lauric acid; myristic acid; palmitic acid; and stearic acid.

A use proportion of the fatty acid component (b) is preferably in a range of 1 to 60 parts by weight, more preferably 5 to 30 parts by weight with respect to 100 parts by weight of resin solids of the epoxy group-containing vinyl copolymer (a), and this is preferable in view of the curability and weathering resistance of the resulting coating film.

The silicon resin (c) is a silicon resin containing a hydroxyl group and/or an alkoxyl group which is directly bonded to a silicon atom, and for example, a silicon resin represented by the following rational formula can preferably be used.

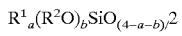

$$R^1_a(R^2O)_b SiO_{(4-a-b)/2}$$

(In the formula, $R^1$ denotes the same or different alkyl or aryl group having 1 to 8 carbon atoms, $R^2$ denotes H or an alkyl group having 1 to 8 carbon atoms, a is in a range of $0 \leq a \leq 3.5$, and b is in a range of $0.0005 \leq b \leq 4.0$.)

In the above formula, examples of the alkyl group having 1 to 8 carbons in $R^1$ include methyl group, ethyl group, propyl group, pentyl group, hexyl group, heptyl group, octyl group, cyclopentyl group, and cyclohexyl group, and examples of the aryl group in $R^1$ include phenyl group, and tolyl group. Among these, as $R^1$, the methyl group, ethyl group, and phenyl group are desirable in view of ease of obtaining, and reactivity.

For $R^2$, examples of H and/or the alkyl group having 1 to 8 carbon atoms include methyl group, ethyl group, propyl group, pentyl group, hexyl group, heptyl group, and octyl group. Among these, in view of the reactivity, hydrogen, methyl group, and ethyl group are preferable.

In the formula, a is in a range of $0 \leq a \leq 3.5$, and b is in a range of $0.0005 \leq b \leq 4.0$. These ranges are preferable in view of reactivity with the hydroxyl group in the epoxy group-containing vinyl copolymer (a), or a reaction product of the copolymer (a) with the fatty acid component (b), resulting coating film physical properties, curability, weathering resistance, and the like.

Moreover, for the silicon resin (c), when a number-average molecular weight is in a range of 90 to 100,000 by conversion in terms of polystyrene, it is preferable in view of the physical properties and curability of the coating film formed using the resulting silicon modified vinyl-based resin (A).

Examples of a commercially available silicon resin (c) include: SH-6018, DC3074, DC3037, and SR2402 (products of Dow Corning Toray Silicone Co., Ltd.); KR9218 and X-40-9220 (products of Shin-Etsu Chemical Co., Ltd.); and TSR165 and XR-31B1763 (products of Toshiba Silicone Co., Ltd.).

The silicon resin (c) can be one of or a mixture of at least two of hydroxyl or alkoxyl group-containing silicon resins such as the commercially available products mentioned above, a partial hydrolysis/condensation product of one of or the mixture of at least two of the aforementioned products, and a partial hydrolysis/condensation product of the hydroxyl or alkoxyl group-containing silicon resin with diorganodialkoxysilane or organotrialkoxysilane. Examples of diorganodialkoxysilane include dimethyldimethoxysilane, dimethyldiethoxysilane, diphenyldimethoxysilane, and diphenyldiethoxysilane, methylphenyldimethoxysilane, and examples of organotrialkoxysilane include methyltrimethoxysilane, methyltriethoxysilane, methyltriisopropoxysilane, phenyltrimethoxysilane, and phenyltriethoxysilane.

When the use proportion of the silicon resin (c) is preferably in a range of 1 to 370 parts by weight, more preferably 1 to 200 parts by weight, furthermore preferably 1 to 100 parts by weight with respect to 100 parts by weight of resin solids of the epoxy group-containing vinyl copolymer (a), it is preferable in view of the curability and weathering resistance of the resulting coating film.

In the present invention, to manufacture the oxidative curable silicon modified vinyl-based resin (A), a reaction order of the epoxy group-containing vinyl copolymer (a), the fatty acid component (b) and the silicon resin (c) is not particularly limited, and these three can simultaneously be reacted, but it is preferable in view of ease of controlling the reaction to first react the epoxy group-containing vinyl copolymer (a) with the fatty acid component (b), and subsequently react the reaction product of the fatty acid modified copolymer with the silicon resin (c).

The reaction of the epoxy group-containing vinyl copolymer (a) with the fatty acid component (b) is based on esterification reaction of the epoxy group in the copolymer (a) with the carboxyl group in the fatty acid component (b), and this reaction usually generates a secondary hydroxyl group.

During this reaction, if necessary, reaction catalysts can be used such as tertiary amines such as N,N-dimethyl aminoethanol; and quaternary ammonium salts such as tetrabutyl ammonium bromide. When the reaction catalyst is used, the usage is appropriately in a range of 0.01 to 100 parts by weight based on 100 parts by weight in total of the copolymer (a) and fatty acid component (b).

Reaction conditions of the copolymer (a) with the fatty acid component (b) are not limited as long as the epoxy group in the copolymer (a) can be reacted with the carboxyl group in the fatty acid component (b) without causing reaction problems such as gelation, and usually conditions for heating of about 100 to 170° C. for about 2 to 10 hours are appropriate.

Reaction of the fatty acid modified copolymer obtained as described above with the silicon resin (c) can be performed by heating, and dehydration or dealcoholization condensation reaction under existence of reaction catalyst if necessary. The dehydration or dealcoholization condensation reaction is performed by reaction of the hydroxyl group in the fatty acid modified copolymer with a hydroxyl group or an alkoxysilyl group in the silicon resin (c). Examples of the hydroxyl group in the fatty acid modified copolymer include a hydroxyl group present in the copolymer (a) prior to a potential reaction with the fatty acid component (b), and a hydroxyl group generated by reaction of the copolymer (a) with the fatty acid component (b).

As the reaction catalyst in the dehydration or dealcoholization condensation reaction, a metal alcoxide compound, metal chelate compound, metal ester compound, or the like is used. Examples of the metal alcoxide compound include: aluminum alcoxides such as aluminum trimethoxide, aluminum triethoxide, aluminum tri-n-propoxide, aluminum tri-isopropoxide, aluminum tri-n-butoxide, aluminum tri-isobutoxide, aluminum tri-sec-butoxide and aluminum tri-tert-butoxide; titanium alcoxides such as tetramethyl titanate, tetraethyl titanate, tetra-n-propyl titanate, tetraiso-propyl titanate, tetra-n-butyl titanate, tetraisobutyl titanate, tetra-tert-butyl titanate, tetra-n-hexyl titanate, tetraisoctyl titanate and tetra-n-lauryl titanate; zirconium alcoxides such as tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate and tetra-n-stearyl zirconate; and dibutyltin dibutoxide. Examples of the metal chelate compound include: aluminum chelate compounds such as tris(ethyl acetoacetate)aluminum, tris(n-propyl acetoacetate)aluminum, tris(isopropyl acetoacetate) aluminum, tris(n-butyl acetoacetate)aluminum, isopropoxy bis(ethyl acetoacetate)aluminum, tris(acetyl acetonate) aluminum, tris(proponylacetonate)aluminum, di-isopropoxy propionyl acetonate aluminum, acetyl acetonate bis (propionyl acetonate)aluminum, monoethyl acetoacetate bis (acetyl acetonate)aluminum, acetyl acetonate aluminum disec-butylate, butyl acetoacetate aluminum ditert-butylate, bis(acetyl acetonate)aluminum monosec-butylate and di(methyl acetoacetate)aluminum monotert-butylate; titanium chelate compounds such as di-isopropoxy bis(ethyl acetoacetate)titanate, di-isopropoxy bis(acetyl acetonate) titanate and di-n-butoxy bis(acetyl acetonate)titanate; zirconium chelate compounds such as tetrakis(acetyl acetonate) zirconium, tetrakis(n-propyl acetoacetate)zirconium and tetrakis(ethyl acetoacetate)zirconium; and dibutyltin bis (acetyl acetonate). Examples of the metal ester compound include tin ester compounds such as dibutyltin acetate, dibutyltin di(2-ethylhexylate), dibenzyltin di(2-ethylhexylate), dibutyltin dilaurate, and dibutyltin di-isooctyl malate. These reaction catalysts can be used solely or as a combination of at least two thereof.

For the reaction catalyst, use of preferably 0.001 to 5 parts by weight, more preferably 0.005 to 1 part by weight is appropriate with respect to 100 parts by weight in total of the fatty acid modified copolymer and the silicon resin (c) as far as reaction promoting effect is concerned.

Reaction conditions in reaction of the fatty acid modified copolymer with the silicon resin (c) are not particularly limited as long as the dehydration or dealcoholization condensation reaction proceeds. Usually, reaction temperature is preferably in a range of 60 to 250° C., more preferably 80° C. to 200° C., furthermore preferably 100° C. to 180° C., and reaction time is preferably in a range of 0.5 to 24 hours, more preferably 1 to 12 hours. Moreover, in the reaction, when water or alcohol generated by the reaction is removed from a system, the reaction can smoothly proceed.

For the reaction, the dehydration or dealcoholization condensation reaction may be performed until the obtained resin can fulfill a performance of coating resin, and some of hydroxyl groups or substantially all of hydroxyl groups may be reacted. A degree of progress of reaction can be known by a method of measuring an infrared ray absorption spectrum (IR) to obtain an absorption intensity attributed to the hydroxyl group, a method of measuring a water or alcohol amount generated by the reaction, a rise in viscosity of the system, and the like.

The oxidative curable silicon modified vinyl-based resin (A) obtained as described above can preferably be used as the coating resin, and the present invention provides an ordinary temperature curable coating composition containing a resin component of the oxidative curable silicon modified vinyl-based resin (A).

In the present invention, the oxidative curable silicon modified vinyl-based resin (A) can be used together with a polymer dispersion (B) obtained by polymerizing the polymerizable unsaturated monomer in an organic liquid in which a polymerizable unsaturated monomer is dissolved and a polymer formed from the monomer fails to be dissolved under existence of a dispersion stabilizer (d) soluble in the organic liquid.

Examples of the organic liquid include: aliphatic hydrocarbon-based solvents such as n-hexane, n-octane, 2,2,2-trimethyl pentane, isooctane, n-nonane, cyclohexane, and methylcyclo hexane; aromatic hydrocabon-based solvents such as benzene, toluene, xylene and ethyl benzene; petroleum-based solvents such as mineral spirit, "SWAZOL 1000" (product of Cosmo Oil Co., Ltd.), petroleum ether, petroleum benzine, and petroleum naphtha; ketone-based solvents such as methyl isobutyl ketone; ester-based solvents such as isobutyl acetate; and alcohol-based solvents such as isopropanol. These solvents can arbitrarily be used alone, or as a mixture of two or more thereof.

Various conventional known resins can be applied to the dispersion stabilizer (d) soluble in the organic liquid, and a resin with a number-average molecular weight of the order of 1,000 to 100,000 is usually used. As the dispersion stabilizer (d), a resin having an oxidative polymerizable double bond is preferable as far as the formed film curability is concerned. The resin having the oxidative polymerizable double bond is usually a copolymer obtained by subjecting preferably 5 to 70 wt %, more preferably 15 to 50 wt % of a first polymerizable unsaturated monomer having the oxidative polymerizable double bond, and preferably 30 to 95 wt %, more preferably 50 to 85 wt % of a second polymerizable unsaturated monomer copolymerizable with the first monomer to radical polymerization in the organic liquid under existence of the radical polymerization initiator.

The first polymerizable unsaturated monomer having the oxidative polymerizable double bond is a molecule that includes in its structure the following formula.

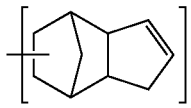

Examples include dihydrodicyclopentadiene derivatives such as dihydrodicyclopentadiene mono(meth)acrylate, dihydrodicyclopentadienethyl mono(meth)acrylate and dihydrodicyclopentadiene monoaryl ether.

Examples of the second polymerizable unsaturated monomer copolymerizable with the first monomer include methyl (meth)acrylate, ethyl (meth)acrylate, n-butyl (meth)acrylate, isobutyl (meth)acrylate, t-butyl (meth)acrylate, hexyl (meth)acrylate, 2-ethylhexyl (meth)acrylate, n-octyl (meth)acrylate, decyl (meth)acrylate, lauryl (meth)acrylate, stearyl (meth)acrylate, cyclohexyl (meth)acrylate, isobornyl (meth)acrylate, 2-hydroxyethyl (meth)acrylate, glycidyl (meth)acrylate, and styrene, and one or two or more thereof can be used together.

Examples of the radical polymerization initiator include: azo-based initiators such as 2,2'-azobisisobutyronitrile and 2,2'-azobis(2,4-dimethylvaleronitrile); and peroxide-based initiators such as lauryl peroxide, t-butylperoxy-2-ethylhexanoate and benzoyl peroxide.

Examples of the polymerizable unsaturated monomer polymerized under existence of the dispersion stabilizer (d) obtained as described above include methyl (meth)acrylate, ethyl (meth)acrylate, n-butyl (meth)acrylate, isobutyl (meth)acrylate, t-butyl (meth)acrylate, hexyl (meth)acrylate, 2-ethylhexyl (meth)acrylate, (meth)acrylonitrile, 2-methoxyethyl (meth)acrylate, 2-methoxybutyl (meth)acrylate, cyclohexyl (meth)acrylate, isobornyl (meth)acrylate, (meth)acrylamide, vinyl pyrrolidone, (meth)acrylate, maleic acid, 2-hydroxyethyl (meth)acrylate, glycidyl (meth)acrylate, styrene, vinyl toluene, and vinyl acetate, and one or two or more thereof can be used together.

The dispersion polymerization is performed in the organic liquid under existence of the radical polymerization initiator. The aforementioned radical polymerization initiators can similarly be used.

The polymer dispersion (B) obtained as described above is a stable particulate dispersion whose light intensity-average particle diameter by dynamic light scattering is of the order of preferably 150 to 900 nm, more preferably 250 to 400 nm.

In the present invention, based on a total solid content weight of both the components (A) and (B), (A) may be contained in a range of preferably 5 to 95 wt %, more preferably 50 to 90 wt %, and (B) may be contained in a range of preferably 5 to 95 wt %, more preferably 10 to 50 wt %. When this range deviates (with less component (A) and more component (B)), the weathering resistance tends to be possibly deteriorated. On the other hand, with less component (B) and more component (A), the alkali resistance of the coating film tends to be unfavorably insufficient.

The coating composition of the present invention may further be blended, if necessary, with additives for the coating such as an oxidative curable reaction catalyst, pigments, organic solvent, ultraviolet absorber, light stabilizer, surface adjuster, pigment dispersant, rheology control agent, coating-liquid anti-skinning agent, mildew-proofing agent, anti-algae agent, plasticizer, and antifoamer.

Examples of the oxidative curable reaction catalyst include organic metal compounds such as cobalt octylate, cobalt naphthenate, manganese octylate, manganese naphthenate, zirconium octylate, zirconium naphthenate and lead octylate.

The coating film obtained by the composition of the present invention is very satisfactory in appearances such as surface gloss, superior in weathering resistance, chemical resistance, and further alkali resistance, and curable in only several hours after coating under the existence of oxidative curable reaction catalyst, and indicates superior ordinary-temperature curability.

The coating composition of the present invention can be applied to material surfaces of metal, slate, and mortar, undercoating surfaces, or former coating surfaces, and particularly the coating composition of the present invention containing the component (B) is useful as inorganic building materials such as slate and mortar.

EXAMPLES

The present invention will be described hereinafter in more detail by way of examples. Terms "parts" and "%" mean "parts by weight" and "wt %", respectively.

Manufacturing of Silicon Modified Vinyl-based Resin Solution

Manufacturing Example 1

After feeding 100 parts of mineral spirit to a flask, nitrogen gas was passed, and agitation was performed until temperature rose to 115° C. Subsequently, while the temperature was kept at 115° C., a mixture of the following monomers was dripped for four hours.

| | |
|---|---|
| styrene | 25 parts |
| n-butyl (meth)acrylate | 15 parts |
| i-butyl (meth)acrylate | 20 parts |
| 2-ethylhexyl acrylate | 20 parts |
| glycidyl (meth)acrylate | 20 parts |
| 2,2'-azobisisobutylonitrile | 1 part |

Subsequently, after aging at 115° C. for two hours, temperature was raised to 140° C., and 30 parts of linseed oil fatty acid, and 0.4 part of reaction catalyst of N,N-dimethylaminoethanol were added and held at 160° C. for five hours to perform addition reaction of the fatty acid. A resin acid number was traced by a KOH titration method, and a time when the resin acid number reached 1.0 or less was determined as the end. After completion of the reaction, 45 parts of xylene was added for dilution to obtain a solution of fatty acid modified copolymer (a) which contains 50% of nonvolatile content and which was brown, transparent and viscous.

Subsequently, cooling was performed to obtain 100° C., a water separator was mounted on the flask, 20 parts of a silicon resin SH-6018 (manufactured by Dow Corning Toray Silicone Co., Ltd.), 14 parts of mineral spirit, 6 parts of xylene and 0.20 parts of reaction catalyst of tetra-n-butyltitanate were added, temperature was raised to 165° C., water was separated under reflux with the water separator and reaction was performed for five hours to obtain a silicon modified vinyl-based resin solution (A-1) which was brown, transparent and viscous with about 50% of nonvolatile content.

Manufacturing Example 2

After 289.4 parts of the fatty acid modified copolymer (a) solution with 50% of nonvolatile content obtained in the pre-process of Manufacturing Example 1, 10 parts of a silicon resin SH-6018, 7 parts of mineral spirit, 3 parts of xylene and 0.10 parts of the reaction catalyst of tetra-n-butyltitanate were supplied to the flask with the water separator mounted thereon, temperature was raised to 165° C., water was separated under reflux with the water separator and reaction was performed for five hours to obtain a brown, transparent and viscous silicon modified vinyl-based resin solution (A-2) containing 50% of nonvolatile content.

Manufacturing Example 3

After supplying 100 parts of mineral spirit to the flask, nitrogen gas was passed, and agitation was performed until temperature was raised to 115° C. Subsequently, while the temperature was kept at 115° C., the mixture of the following monomers was dripped for four hours.

| | |
|---|---|
| styrene | 20 parts |
| n-butyl (meth)acrylate | 15 parts |
| i-butyl (meth)acrylate | 20 parts |
| 2-ethylhexyl acrylate | 20 parts |
| glycidyl (meth)acrylate | 20 parts |
| RUVA-093 (see Note 1 below) | 5 parts |
| 2,2'-azobisisobutylonitrile | 1 part |

Subsequently, after aging at 115° C. for two hours, temperature was raised to 140° C., and 30 parts of linseed oil fatty acid, and 0.4 parts of reaction catalyst of N,N-dimethylaminoethanol were added and held at 160° C. for five hours to perform addition reaction of the fatty acid. The resin acid number was traced by the KOH titration method, and the time when the resin acid number reached 1.0 or less was determined as the end. After completion of the reaction, 45 parts of xylene was added for dilution to obtain a brown, transparent and viscous solution of fatty acid modified copolymer (b) containing 50% of nonvolatile content.

Subsequently, cooling was performed to obtain 100° C., the water separator was mounted on the flask, 5 parts of a silicon resin SH-6018, 3.5 parts of mineral spirit, 1.5 parts of xylene and 0.05 parts of reaction catalyst of tetra-n-butyltitanate were added, temperature was raised to 165° C., water was separated under reflux with the water separator and reaction was performed for eight hours to obtain a brown, transparent and viscous silicon modified vinyl-based resin solution (A-3) containing 50% of nonvolatile content.

(Note 1) RUVA-093: 2-(2'-hydroxy-5'-methacryloxyphenyl)-2H-benzotriazole, manufactured by Otsuka Chemical Co., Ltd.

Manufacturing of Polymer Dispersion

Manufacturing Example 4

After feeding 100 parts of mineral spirit to the flask, nitrogen gas was passed, and agitation was performed until temperature was raised to 110° C. Subsequently, while the temperature was kept at 110° C., a mixture of the following monomers was dripped for four hours.

| | |
|---|---|
| styrene | 25 parts |
| n-butyl (meth)acrylate | 12 parts |
| i-butyl (meth)acrylate | 43 parts |
| 2-ethylhexyl acrylate | 20 parts |
| 2,2'-azobisisobutylonitrile | 1.5 parts |

Subsequently, after raising temperature to 120° C. and aging for two hours, a substantially colorless transparent acrylic resin solution containing 55% of nonvolatile content was obtained as a dispersion stabilizer.

After feeding 185.4 parts of dispersion stabilizer manufactured as described above, 25.5 parts of isobutyl acetate and 101 parts of mineral spirit to the flask, nitrogen gas was passed, and agitation was performed until temperature was raised to 100° C. Subsequently, while the temperature was kept at 100° C., a mixture of the following monomers was dripped for three hours.

| | |
|---|---|
| methyl (meth)acrylate | 25 parts |
| ethyl acrylate | 15 parts |
| methyl acrylate | 40 parts |
| 2-hydroxyethyl acrylate | 20 parts |
| 2,2'-azobisisobutylonitrile | 1.5 parts |

Subsequently, after aging at 100° C. for three hours, a milky white polymer dispersion (B-1) containing 50% of nonvolatile content was obtained. The light intensity-average particle diameter by the dynamic light scattering method was 370 nm.

Manufacturing Example 5

Manufacturing was performed similarly as Manufacturing Example 4 except that the following mixture was used as a monomer mixture for use in manufacturing of the dispersion stabilizer of the polymer dispersion, and a milky white polymer dispersion (B-2) containing 50% of nonvolatile content was obtained. The particle diameter was 350 nm.

| | |
|---|---|
| FANCRYL FA-512MT (see Note 2) | 10 parts |
| styrene | 25 parts |
| n-butyl (meth)acrylate | 12 parts |
| i-butyl (meth)acrylate | 33 parts |
| 2-ethylhexyl acrylate | 20 parts |
| 2,2'-azobisisobutylonitrile | 1 part |

(Note 2) "FANCRYL FA-512MT": manufactured by Hitachi Chemical Co., Ltd., oxidative curable monomer represented by the following formula.

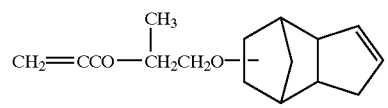

Preparation of Coating Composition

Examples 1 to 3

After adding a curing catalyst of 0.3 parts of cobalt naphthenate and 1.0 part of lead naphthenate to 200 parts of silicon modified vinyl-based resin solution containing 50% of nonvolatile content obtained in each of the aforementioned Manufacturing Examples 1 to 3, uniform agitation was performed to obtain each ordinary temperature curable coating composition. The silicon modified vinyl-based resin solutions, each containing 50% of nonvolatile content, of Manufacturing Examples 1, 2, 3 were used in Examples 1, 2, 3, respectively.

Comparative Example 1

After adding the curing catalyst of 0.3 parts of cobalt naphthenate and 1.0 part of lead naphthenate to 200 parts of fatty acid modified copolymer (a) solution containing 50% of nonvolatile content obtained in the pre-process of Manufacturing Example 1, uniform agitation was performed to obtain the ordinary temperature curable coating composition.

Performance Test

For the respective ordinary temperature curable coating compositions obtained in Examples 1 to 3 and Comparative Example 1, storage stability during storage at 20° C. for one week was evaluated by presence/absence of sediment (○: no sediment, good storage stability).

Furthermore, a plate coated with the ordinary temperature curable coating composition was subjected to various tests based on the following test method. Test results are shown later in Table 1.

(1) Initial Drying Property

After coating a glass plate with the ordinary temperature curable coating composition with a 300 μm applicator, the coating film was allowed to stand in a room of 20° C., 75% RH for six hours, and a tacky-dry property was checked.
◎: No fingerprint stuck.
○: Slight fingerprint stuck.
Δ: Fingerprint stuck.
X: The coating film stuck to a finger.

(2) Double Coating Operability

After coating the glass plate with the ordinary temperature curable coating composition with the 300 μm applicator, the coating film was allowed to stand in the room of 20° C., 75% RH for six hours, the ordinary temperature curable coating composition was applied to the coating film with a brush to obtain a dried film thickness of 80 to 100 μm, and coating operability and coating film state were observed.
○: No abnormality
Δ: Shrinkage was found on the coating film.
X: The coating film after first coating was re-dissolved, and brush stroke was felt heavy.

(3) Coating Film Gloss

After applying the ordinary temperature curable coating composition to the surface of a slate plate coated with "ALES CELAMILD" (manufactured by Kansai Paint Co., Ltd., white matte coating) with the 300 μm applicator and performing drying for one week, a 60°-specular gloss was measured.
◎: 90% or more
○: 80% or more, less than 90%
Δ: 70% or more, less than 80%
X: Less than 70%

(4) Weathering Resistance

After applying the ordinary temperature curable coating composition to the surface of the slate plate coated with "ALES CELAMILD" (manufactured by Kansai Paint Co., Ltd., white matte coating) with the 300 μm applicator and performing drying for one week, a gloss retention ratio after exposure of 1500 hours was evaluated with a sunshine weatherometer.
◎: 90% or more
○: 80% or more, less than 90%
Δ: 70% or more, less than 80%
X: Less than 70%

(5) Water Resistance

After the slate plate was coated with the ordinary temperature curable coating composition with the 300 μm applicator, and the coated plate was dried in the room of 20° C., 75% RH for one week and dipped in potable water (20° C.) for three days, the coating film state was visually observed.
○: No abnormality
Δ: Slight blister was found.
X: Remarkable blister was found.

(6) Acid Resistance

After dripping 0.5 cc of aqueous solution of sulfuric acid of 0.1N to the coated plate obtained similarly as the initial drying property test, allowing the plate to stand at 20° C. for 24 hours, and rinsing the plate, the coating film state was observed.
○: No abnormality
Δ: Slight whitening was found.
X: Remarkable whitening occurred, and etching on the coating film surface was also found.

TABLE 1

| | Example | | | Comparative Example |
|---|---|---|---|---|
| | 1 | 2 | 3 | 1 |
| Storage stability | ○ | ○ | ○ | ○ |
| Initial drying property | ○ | ○ | ○ | ○ |
| Double coating operability | ○ | ○ | ○ | ○ |
| Coating film gloss | ◎ | ◎ | ○ | Δ |
| Weathering resistance | ◎ | ◎ | ◎ | Δ |
| Water resistance | ○ | ○ | ○ | ○ |
| Acid resistance | ○ | ○ | ○ | ○ |

Examples 4 to 12 and Comparative Example 2

The silicon modified vinyl-based resin solution containing 50% of nonvolatile content obtained by the manufacturing example, and blend composition (solid content in parts by weight) shown in Table 2 were used to subject each component together with 250 parts of glass beads with a diameter of 1.5 mm to sand mill dispersion to obtain a pigment paste; subsequently the polymer dispersion with 50% of nonvolatile content obtained in the manufacturing example, curing catalyst of "DICNATE 1000" (manufactured by Dainippon Ink & Chemicals Inc., active cobalt dryer containing an organic acid salt of cobalt) and zirconium octylate were added at a blend ratio shown in the table (solid content in parts by weight); and uniform agitation was performed to obtain the ordinary temperature curable coating composition. Additionally, in Comparative Example 2, instead of the silicon modified vinyl-based resin solution, the fatty acid modified copolymer (a) solution with 50% of nonvolatile content obtained in the manufacturing process was used. As seen in Table 2, total weight ratio of a solid content of silicon modified vinyl-based resin (A-1), (A-2) or (A-3) and a solid content of said polymer dispersion (B-1) or (B-2) is 100 parts.

Performance Test

The respective ordinary temperature curable coating compositions obtained in Examples 4 to 12 and Comparative Example 2 were subjected to the following weathering resistance and alkali resistance tests. The test results are shown later in Table 2.

(7) Alkali Resistance

The slate plate coated with "VP SEALER TOMEI" (manufactured by Kansai Paint Co., Ltd., vinyl chloride resin-based transparent sealer) was coated with the ordinary temperature curable coating composition with the brush to a coating amount of 160 g/m², and allowed to stand in the room of 20° C., 75% RH for six hours. Subsequently, after dripping 0.5 cc of aqueous solution of sodium hydroxide of 0.1 N to the coating film surface, allowing the coated plate in the room of 20° C., 75% RH for 24 hours, and rinsing the plate, the coating film state was observed.

○: No abnormality
Δ: Slight whitening was found.
X: Remarkable whitening and surface etching were found.

(8) Weathering Property

A formation treated steel plate coated with "ESCO" (manufactured by Kansai Paint Co., Ltd., an epoxy resin-based anticorrosive coating) was coated with the ordinary temperature curable coating composition with the brush to obtain the coating amount of 160 g/m², and allowed to stand in the room of 20° C., 75% RH for seven days. Subsequently, the gloss retention ratio after exposure of 1500 hours was evaluated with the sunshine weatherometer.

◎: 90% or more
○: 80% or more, less than 90%
Δ: 70% or more, less than 80%
X: Less than 70%

In the present invention, for an oxidative curable silicon modified vinyl-based resin, a main chain is a vinyl polymer, an unsaturated fatty acid is added to the polymer to impart ordinary temperature drying properties, and a further silicon resin is added to enhance weathering resistance of an obtained coating film. vinyl-based resin is used in combination with a polymer dispersion, whereby alkali resistance is secured.

TABLE 2

| | Example | | | | | | | | | Comparative Example |
|---|---|---|---|---|---|---|---|---|---|---|
| | 4 | 5 | 6 | 7 | 8 | 9 | 10 | 11 | 12 | 2 |
| Coating blend Pigment dispersant Silicon modified Vinyl-based resin solution | | | | | | | | | | |
| A-1 | 90 | 70 | 50 | 30 | 70 | 50 | | | 100 | |
| A-2 | | | | | | | 50 | | | |
| A-3 | | | | | | | | 50 | | |
| Fatty acid modified copolymer solution a | | | | | | | | | | 20 |
| Titanium white | 50 | 50 | 50 | 50 | 50 | 50 | 50 | 50 | 50 | 50 |
| Polymer dispersion | | | | | | | | | | |
| B-1 | 10 | 30 | 50 | 70 | | | 50 | 50 | | 80 |
| B-2 | | | | | 30 | 50 | | | | |
| Mineral spirit | 10 | 10 | 10 | 10 | 10 | 10 | 10 | 10 | 10 | 10 |
| DICNATE1000 | 6 | 6 | 6 | 6 | 6 | 6 | 6 | 6 | 6 | 6 |
| Zirconium octylate | 1 | 1 | 1 | 1 | 1 | 1 | 1 | 1 | 1 | 1 |
| Performance test | | | | | | | | | | |
| Alkali resistance | ○ | ○ | ○ | ○ | ○ | ○ | ○ | ○ | Δ | ○ |
| Weathering resistance | ◎ | ◎ | ◎ | ○ | ◎ | ◎ | ◎ | ◎ | ◎ | X |

A coating composition of the present invention contains a resin component of the oxidative curable silicon modified vinyl-based resin, and is an ordinary temperature curable coating composition which can form the coating film superior in weathering resistance, coating film gloss, and coating operation properties such as storage property, initial drying property and brush stroke during double coatings with a brush.

Furthermore, in the coating composition of the present invention, the oxidative curable silicon modified vinyl-based resin is used in combination with a polymer dispersion, whereby alkali resistance is secured.

The disclosure of Japanese Patent Application Nos. 11-302110 filed Oct. 25, 1999 and 2000-87857 filed Mar. 28, 2000 including specification, drawings and claims are herein incorporated by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An ordinary temperature curable coating composition comprising an oxidative curable silicon modified vinyl-based resin (A) which is obtained by combining an epoxy group-containing vinyl copolymer (a) with an unsaturated fatty acid-containing fatty acid component (b) and a silicon resin (c); said vinyl copolymer (a) is a copolymer of an epoxy group-containing polymerizable unsaturated first monomer and a polymerizable unsaturated second monomer copolymerizable with the first monomer; said silicon resin (c) contains a silicon atom and a hydroxyl group and/or an alkoxyl group which is bonded to the silicon atom.

2. The ordinary temperature curable coating composition according to claim 1, wherein a copolymerization ratio of the first and second monomers is that the first monomer is in a range of 3 to 70 wt % and the second monomer is in a range of 30 to 97 wt %.

3. The ordinary temperature curable coating composition according to claim 1 wherein the epoxy group-containing vinyl copolymer (a) is a copolymer whose number-average molecular weight is 1,000 to 100,000 and whose glass transition temperature is 0° C. to 100° C.

4. The ordinary temperature curable coating composition according to claim 1, wherein the unsaturated fatty acid-containing fatty acid component (b) has an iodine number of 50 to 200.

5. The ordinary temperature curable coating composition according to claim 1, wherein the oxidative curable silicon modified vinyl-based resin (A) is obtained by adding the fatty acid component (b) to the epoxy group-containing vinyl copolymer (a) followed by adding the silicon resin (c).

6. The ordinary temperature curable coating composition according to claim 1, said composition further comprises a polymer dispersion (B) obtained by polymerizing a polymerizable unsaturated third monomer in an organic liquid in the presence of a dispersion stabilizer (d) soluble in the organic liquid, the third monomer is dissolved in the organic liquid and a polymer formed from the third monomer is not dissolved in the organic liquid, a solid content of said vinyl-based resin (A) is in a range of 5 to 95 wt % and a solid content of said polymer dispersion (B) is in a range of 5 to 95 wt %, based on total solid content weight of said vinyl-based resin (A) and said polymer dispersion (B).

7. The ordinary temperature curable coating composition according to claim 6, the dispersion stabilizer (d) is a copolymer of a polymerizable unsaturated fourth monomer having an oxidative polymerizable double bond and a polymerizable unsaturated fifth monomer copolymerizable with the fourth monomer.

8. The ordinary temperature curable coating composition according to claim 7, the fourth monomer includes a a following formula therein:

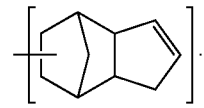

9. The ordinary temperature curable coating composition according to claim 1, wherein said silicon resin (c) is combined with epoxy group-containing vinyl copolymer (a) and unsaturated fatty acid component (b) by way of a reaction of a hydroxyl group or an alkoxysilyl group in said silicon resin (c) with a hydroxyl group in a reaction product of said vinyl copolymer (a) and said fatty acid component (b).

* * * * *